US007109973B2

(12) United States Patent
Fyke et al.

(10) Patent No.: US 7,109,973 B2
(45) Date of Patent: Sep. 19, 2006

(54) MOBILE DEVICE WITH ROTATABLE KEYBOARD

(75) Inventors: Steven H. Fyke, Fort Erie (CA); Jason T. Griffin, Waterloo (CA); Zane K. Moi, Kitchener (CA)

(73) Assignee: Research In Motion Limited, Waterloo (CA)

( * ) Notice: Subject to any disclaimer, the term of this patent is extended or adjusted under 35 U.S.C. 154(b) by 451 days.

(21) Appl. No.: 10/437,626

(22) Filed: May 14, 2003

(65) Prior Publication Data

US 2004/0227733 A1 Nov. 18, 2004

(51) Int. Cl.
*G09G 5/00* (2006.01)

(52) U.S. Cl. ...................................... 345/169; 345/156

(58) Field of Classification Search ................ 345/156, 345/157, 158–169, 171, 172, 173, 184, 905; 455/556, 344, 348; 379/110.01; 708/109; 341/22
See application file for complete search history.

(56) References Cited

U.S. PATENT DOCUMENTS

| | | | | |
|---|---|---|---|---|
| 4,029,915 | A | 6/1977 | Ojima | |
| 4,221,064 | A * | 9/1980 | Sebastian | 40/109 |
| 4,449,839 | A | 5/1984 | Bleuer | |
| D278,341 | S | 4/1985 | Scheid | |
| D293,241 | S | 12/1987 | Wan et al. | |
| D312,628 | S | 12/1990 | Yokoi et al. | |
| D313,401 | S | 1/1991 | Tanabe | |
| D313,413 | S | 1/1991 | Langton | |
| 5,059,048 | A | 10/1991 | Sirkin | |
| 5,184,830 | A | 2/1993 | Okada et al. | |
| 5,217,295 | A | 6/1993 | Tortola et al. | |
| 5,288,158 | A | 2/1994 | Matias | |
| 5,336,001 | A | 8/1994 | Lichtenberg | |
| 5,337,346 | A | 8/1994 | Uchikura | |
| 5,360,280 | A | 11/1994 | Camacho et al. | |
| 5,367,298 | A | 11/1994 | Axthelm | |
| D357,253 | S | 4/1995 | Wong | |

(Continued)

FOREIGN PATENT DOCUMENTS

| | | |
|---|---|---|
| EP | 0267801 | 5/1988 |

(Continued)

OTHER PUBLICATIONS

"Programmable Calculators: Hewlett-Packard HP-200LX," Viktor T. Toth, copyr. 2001, 2002, from web page at www.rskey.org/hp2001x.htm.

(Continued)

*Primary Examiner*—Bipin Shalwala
*Assistant Examiner*—Nitin Patel
(74) *Attorney, Agent, or Firm*—Krishna K. Pathiyal; Novak Druce & Quigg, LLP

(57) ABSTRACT

A mobile device is provided having a rotatable keyboard. The keyboard is attached to the mobile device and is rotatable in a single plane with respect to the device's housing between a first and second position. A plurality of keys are provided having first indicia in a first orientation relating to key functions in the first position and second indicia in a second orientation relating to key functions in the second position. The indicia are properly oriented with respect to the user in the first and second positions to display a telephone keypad and an alternate keyboard. The arrangement provides greater ergonomic comfort to a user when entering text. The mobile device can assign functions to each key based on a determined keyboard position and can include a weighted end piece to protect the rotatable keyboard from potential damage due to impact.

7 Claims, 4 Drawing Sheets

U.S. PATENT DOCUMENTS 5,410,141 A 4/1995 Koenck et al.
5,410,333 A 4/1995 Conway
5,426,449 A 6/1995 Danziger
D359,920 S 7/1995 Sakamoto
5,436,954 A 7/1995 Nishiyama et al.
5,457,454 A 10/1995 Sugano
D367,043 S 2/1996 Ross et al.
5,500,643 A 3/1996 Grant
5,543,787 A 8/1996 Karidis et al.
5,563,631 A 10/1996 Masunaga
5,575,576 A 11/1996 Roysden, Jr.
5,600,790 A 2/1997 Barnstijn et al.
5,606,712 A 2/1997 Hidaka
5,611,031 A 3/1997 Hertzfeld et al.
D381,021 S 7/1997 Williams et al.
5,659,307 A 8/1997 Karidis et al.
5,661,605 A 8/1997 Conway
D383,756 S 9/1997 Henderson et al.
5,672,108 A 9/1997 Lam et al.
D386,497 S 11/1997 Huslig et al.
5,689,253 A 11/1997 Hargreaves et al.
D390,509 S 2/1998 Antzinas et al.
5,737,394 A 4/1998 Anderson et al.
5,786,776 A 7/1998 Kisaichi et al.
D397,369 S 8/1998 Rissman
D397,728 S 9/1998 Yuen et al.
D399,537 S 10/1998 Chi et al.
5,818,437 A 10/1998 Grover et al.
5,825,353 A 10/1998 Will
5,827,082 A 10/1998 Laine
D402,572 S 12/1998 Han
D403,362 S 12/1998 Fai
5,861,821 A 1/1999 Kato et al.
5,893,798 A 4/1999 Stambolic et al.
5,915,228 A 6/1999 Kunihiro et al.
5,920,308 A 7/1999 Kim
5,931,873 A 8/1999 Cisar
5,963,197 A 10/1999 Bacon et al.
5,974,238 A 10/1999 Chase, Jr.
D416,256 S 11/1999 Griffin et al.
5,982,520 A 11/1999 Weiser et al.
5,995,026 A 11/1999 Sellers
6,005,496 A 12/1999 Hargreaves et al.
6,006,351 A 12/1999 Peretz et al.
6,009,333 A 12/1999 Chaco
6,014,429 A 1/2000 LaPorta et al.
6,014,573 A 1/2000 Lehtonen et al.
D420,351 S 2/2000 Waldner
6,023,779 A 2/2000 Fullam et al.
6,047,047 A 4/2000 Aldridge et al.
6,047,196 A 4/2000 Makela et al.
6,049,796 A 4/2000 Siitonen et al.
6,052,070 A 4/2000 Kivela et al.
6,084,576 A 7/2000 Leu et al.
6,091,956 A 7/2000 Hollenberg
6,094,197 A 7/2000 Buxton et al.
6,102,594 A 8/2000 Strom
6,103,979 A 8/2000 Motoyama et al.
6,107,997 A 8/2000 Ure
D432,511 S 10/2000 Eckholm
D433,017 S 10/2000 Martinez
D433,460 S 11/2000 Griffin et al.
6,148,261 A 11/2000 Obradovich et al.
6,157,323 A 12/2000 Tso et al.
D436,591 S 1/2001 Abston et al.
6,212,412 B1 4/2001 Rogers et al.
D441,733 S 5/2001 Do et al.
6,243,789 B1 6/2001 Hasbun et al.
6,278,442 B1 8/2001 Griffin et al.
6,295,052 B1 9/2001 Kato et al.
6,297,795 B1 10/2001 Kato et al.
6,304,261 B1 10/2001 Shields et al.
6,304,431 B1 10/2001 Kim
6,310,609 B1 10/2001 Morgenthaler
D451,079 S 11/2001 Ali
D454,349 S 3/2002 Makidera et al.
D454,849 S 3/2002 Eckholm
6,356,258 B1 3/2002 Kato et al.
6,374,277 B1 4/2002 Vong et al.
D456,794 S 5/2002 Laverick et al.
6,385,463 B1 5/2002 Lieberman et al.
6,396,482 B1 5/2002 Griffin et al.
D458,239 S 6/2002 Shim et al.
D459,327 S 6/2002 Ali
D460,068 S 7/2002 Lanzaro et al.
D460,493 S 7/2002 Griffin et al.
D461,803 S 8/2002 Griffin et al.
6,452,588 B1 9/2002 Griffin et al.
D464,995 S 10/2002 Griffin et al.
6,459,968 B1 10/2002 Kochie
6,489,950 B1 12/2002 Griffin et al.
6,507,336 B1 1/2003 Lunsford
D472,225 S 3/2003 Griffin
6,535,749 B1 3/2003 Iwata et al.
6,538,651 B1 3/2003 Haymann et al.
D472,551 S 4/2003 Griffin
D473,226 S 4/2003 Griffin
D476,985 S 7/2003 Griffin
D478,585 S 8/2003 Griffin
6,611,254 B1 8/2003 Griffin et al.
D479,233 S 9/2003 Griffin
D480,722 S 10/2003 Griffin
6,630,924 B1 10/2003 Peck
6,647,367 B1 11/2003 McArthur et al.
6,658,272 B1 * 12/2003 Lenchik et al. ............. 345/164
6,661,404 B1 * 12/2003 Sirola et al. ................ 345/168
6,704,007 B1 * 3/2004 Clapper ...................... 345/204
6,731,227 B1 * 5/2004 Horie .......................... 341/22
2001/0044828 A1 11/2001 Kikinis
2001/0048428 A1 * 12/2001 Ukita et al. ................. 345/169
2003/0044000 A1 * 3/2003 Kfoury et al. ......... 379/433.04
2004/0057769 A1 * 3/2004 Ward et al. ................. 400/481

FOREIGN PATENT DOCUMENTS

EP 0278169 8/1988
EP 0538020 4/1993
EP 0685801 12/1995
EP 0732646 9/1996
EP 0760291 3/1997
EP 1143327 10/2001
WO 9833111 7/1998
WO 9937025 7/1999
WO 0030381 5/2000
WO 0038041 6/2000
WO 0074240 12/2000
WO 0150335 7/2001

OTHER PUBLICATIONS

Anonymous: Triangular Toggle Keys for Touch-Tone Phones; IBM Technical Disclosure Bulletin, vol. 31, No. 1, Jun. 1, pp. 47-49, New York, US.

* cited by examiner

MOBILE DEVICE WITH ROTATABLE KEYBOARD

FIELD OF THE INVENTION

The present invention relates generally to mobile communication devices. More particularly, the present invention relates to a keyboard arrangement for such mobile devices.

BACKGROUND OF THE INVENTION

Many mobile devices, such as cellular telephones, personal digital assistants (PDAs), and other handheld and wireless computing and communicating devices, currently perform numerous and complex functions. With the convergence of many such functions on a single mobile device, the majority of current mobile devices are either primarily telephone-centric, PDA-centric, or data device-centric. In other words, the design and form factor of the mobile device is defined largely by the primary functionality of the mobile device, as well as the mobile device's predecessor products.

The proliferation of services for mobile devices has spawned increased user desire for the ability to access such services on a single integrated device. Many voice-based services are designed for use with a telephone keypad and numeric entry, whereas many data-based services are designed for use with a QWERTY keyboard and text entry. As such, users with a device having a telephone keypad are made to compromise when using data-based services, and users with a device having a QWERTY keyboard are made to compromise when using voice-based services. Users want to use such services on a device that is easily held and carried, and having a form factor that facilitates ease of use when entering either text or numbers.

It is, therefore, desirable to provide a mobile device that provides a key arrangement that allows a user to use provided services in a manner that provides greater ergonomic comfort to the user when entering text while generally retaining a desired form factor.

SUMMARY OF THE INVENTION

In a first aspect, the present invention provides a mobile device comprising a housing and a keyboard attached to the housing for rotation between a first position and a second position generally in a single plane with respect to the housing, the keyboard having a plurality of keys, the keys having first indicia in a first orientation relating to key functions in the first position and second indicia in a second orientation relating to key functions in the second position, the first and second indicia being properly oriented with respect to the user in the first and second positions respectively to display a telephone keypad to the user in the first position and to display an alternate keyboard to the user in the second position.

In a further embodiment, there is provided a keyboard for use with a mobile device having a housing. The keyboard comprises attachment means for attaching the keyboard to the housing for rotation between a first position and a second position generally in a single plane with respect to the housing; and a plurality of keys, the keys having first indicia in a first orientation relating to the first position and second indicia in a second orientation relating to the second position, the first and second indicia being properly oriented with respect to the user in the first and second positions respectively to display a telephone keypad to the user in the first position and to display an alternate keyboard to the user in the second position.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a mobile device having a rotatable keyboard. The keyboard is attached to the mobile device and is rotatable in a single plane with respect to the device's housing between a first and second position. A plurality of keys are provided having first indicia in a first orientation relating to key functions in the first position and second indicia in a second orientation relating to key functions in the second position. The indicia are properly oriented with respect to the user in the first and second positions to display a telephone keypad and an alternate keyboard. The arrangement provides greater ergonomic comfort to a user when entering text. The mobile device can assign functions to each key based on a determined keyboard position and can include a weighted end piece to protect the rotatable keyboard from potential damage due to impact.

Previous attempts to integrate both a telephone keypad and a QWERTY keyboard in a mobile device have either made the QWERTY keyboard too cramped for use, or the width of the keyboard too big for the normal phone market.

Figure 1B:
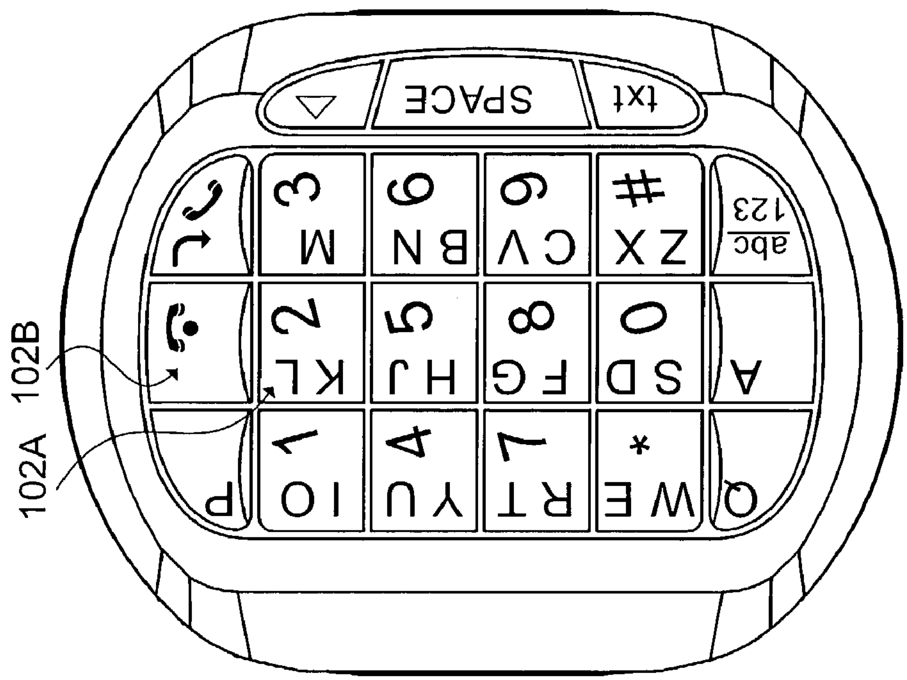
FIG. 1A and FIG. 1B illustrate an keyboard for use with a mobile device according to an embodiment of the present invention.
Figure 1A:
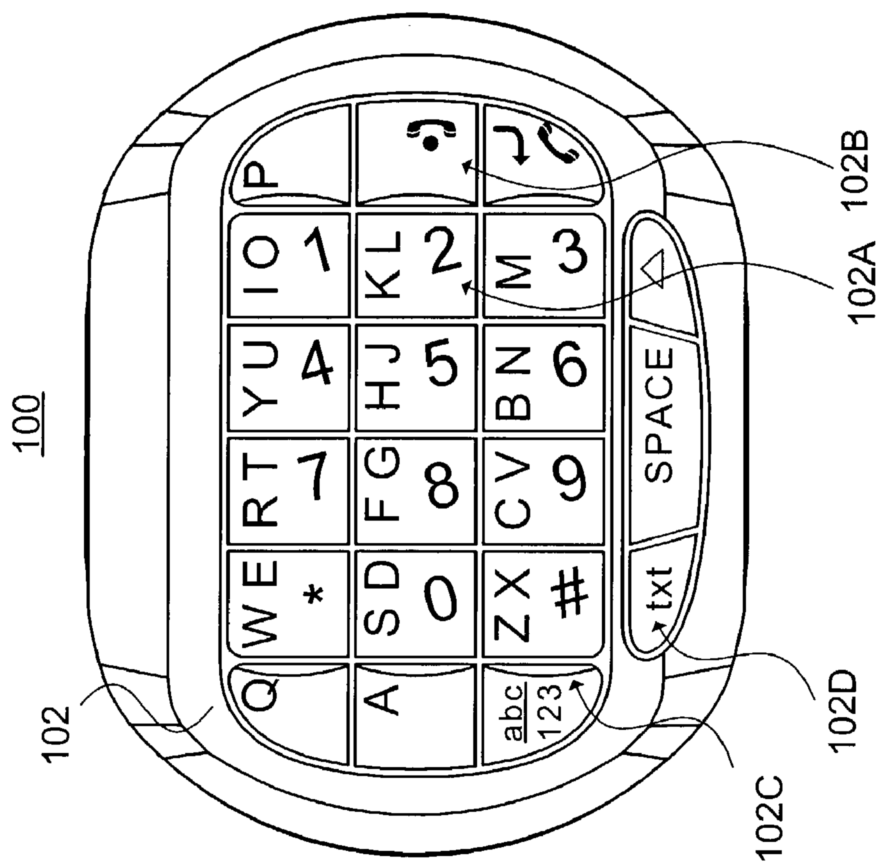

FIG. 1A illustrates a keyboard in a particular position for use with a mobile device according to an embodiment of the present invention. Throughout this description, a telephone keypad position will be referred to primarily as a first position and an alternate keyboard position will be referred to primarily as a second position. In FIG. 1A, the illustrated position is a text entry, or alternate keyboard, position, known as the second position. This is the position in which a user uses the mobile device's keyboard for services such as: electronic mail, text messaging, short message service (SMS). The keyboard arrangement in the alternate keyboard position can include a QWERTY keyboard key arrangement or other similar keyboard-style arrangement, such as the Dvorak keyboard layout.

A mobile device according to an embodiment of the present invention includes a keyboard 100 having a plurality of keys 102. As shown in FIG. 1A, each key 102 has indicia, or a visual indication, for providing the user with an indication of the functionality available when that key is pressed in each of the positions. Some of the keys have first indicia in a first orientation relating to key functions in the first position and second indicia in a second orientation relating to key functions in the second position. The indicia are properly oriented with respect to the user in the first and second positions to display a telephone keypad and an alternate keyboard.

The keyboard 100 is attached to the housing of the mobile device for rotation between a first position and a second position generally in a single plane with respect to the housing. In this particular example, the plane of rotation is the same plane as the mobile device's display. This will be described in further detail with respect to FIG. 5.

Figure 8:
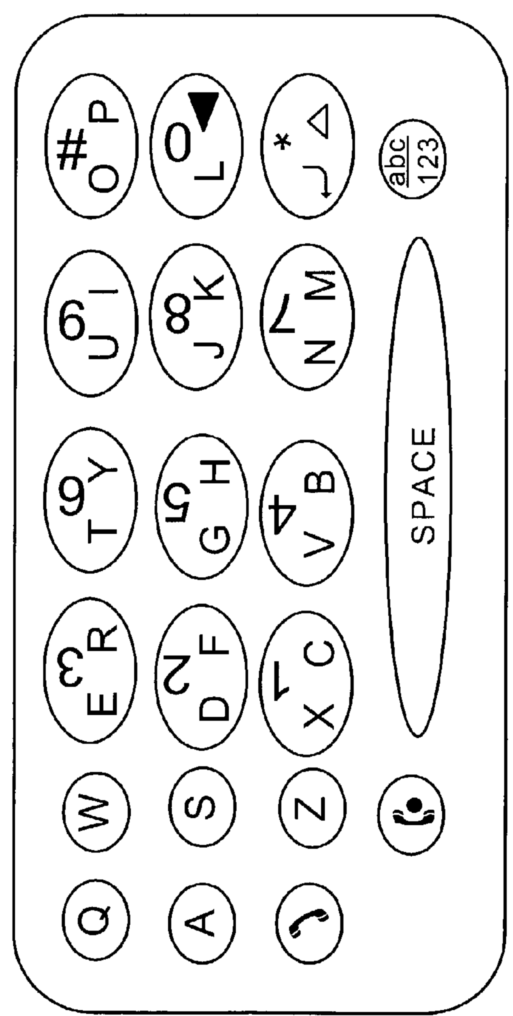
FIG. 8 is a front view of an alternative embodiment of a keyboard for use with a mobile device.

Although the keys 102 are shown with a particular shape in FIG. 1A, this is merely an example; the keys can have any alternative suitable shape that allows for ease of use and that fit appropriately on the mobile device, such as shown in FIG. 8.

Those keys 102 are used for different functions depending on the position of the keyboard. For instance, in FIG. 1A, when the keyboard is in the alternate keyboard position, key 102A is used to input the letter "K" or the letter "L". Key 102B is used, when in the position shown in FIG. 1A, to provide a "backspace" functionality to correct or modify user input.

The ability of each of the keys 102 to have different functions depending on the position of the keyboard is achieved in response to rotation of the keyboard. However, this can be accomplished using hardware and/or software in many different ways. Many of these ways are known to those of skill in the art. For instance, a number of predictive text entry algorithms and arrangements are well known, as well as the repeated activation of the same key to achieve different key functions. Additionally, a dedicated key can be provided so that the user can toggle between the key functionalities of the keys, such as key 102C, or to force the use of the auxiliary keyboard functionality, such as key 102D.

As shown in FIG. 1A, each key 102 has indicia, or a visual indication, for providing the user with an indication of the functionality available when that key is pressed in each of the positions. As mentioned above, those keys have first indicia in a first orientation relating to key functions in the first position and second indicia in a second orientation relating to key functions in the second position. For instance, key 102A has first indicia for the letters "K" and "L" in a first orientation. Those indicia in the first orientation are properly oriented with respect to the user when the keyboard is in the alternate keyboard position. The same key 102A also has second indicia for the number "2" in a second orientation. Those indicia in the second orientation are properly oriented with respect to the user when the keyboard is in the telephone keypad position, as will now be explained with reference to FIG. 1B.

FIG. 1B illustrates a keyboard in a first position for use with a mobile device according to an embodiment of the present invention. The first position illustrated in FIG. 1B is a numeric entry, or telephone keypad, position. This is the position in which a user would use the mobile device's keyboard when using services such as initiating or receiving telephone calls, checking voice-mail, and many list- or menu-based services where providing input using a telephone keypad arrangement, or other similar key arrangement is desired.

In FIG. 1B, it can be seen that the keyboard 100 is now oriented such that key 102A is displayed showing its second indicia and will be used to input the number "2". Key 102B is displayed, when in the position shown in FIG. 1B, showing its first indicia and is used to provide an "on-hook", "END" or "cancel" functionality, as is commonly known for use in telephony applications.

Figure 2:
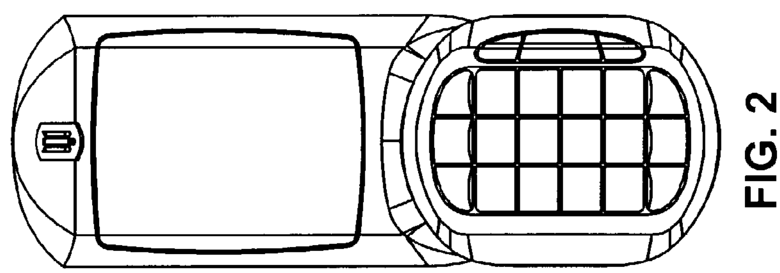
FIG. 2 is a front view of a mobile device according to an embodiment of the present invention with a keyboard shown in a telephone keypad position.
Figure 3:
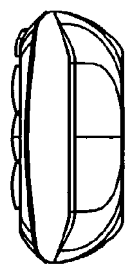
FIG. 3 is an end view of the mobile device of FIG. 2.

FIG. 2 is a front view of a mobile device according to an embodiment of the present invention in a telephone keypad position. FIG. 2 shows the fact that the keyboard, in the telephone keypad position, has a form factor similar to the typical mobile telephone form factor. FIG. 3 is an end view of the mobile device of FIG. 2, and illustrates the fact that the keyboard is preferably flush with the other parts of the mobile device when in the telephone keypad position. As such, it is easily held in one's hand and does not have the awkward feeling of a typical device with a full QWERTY keyboard.

Figure 4:
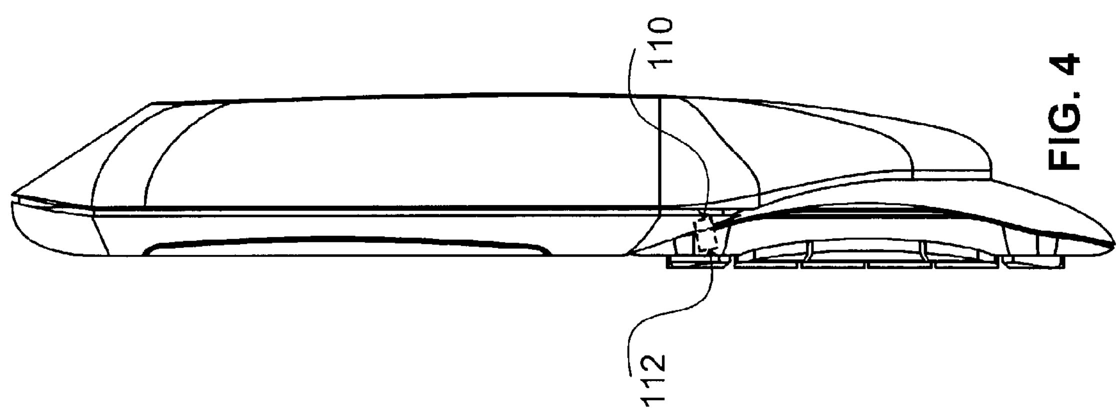
FIG. 4 is a side view of the mobile device of FIG. 2.

A mobile device according to an embodiment of the present invention includes means for determining the position of the keyboard. For instance, the keyboard and the mobile device can have an electrical contact arrangement such that the position of the keyboard can be easily determined. FIG. 4 is a side view of the mobile device of FIG. 2, showing a switch that is used to distinguish between the keyboard positions in order to provide the proper key functionality. The switch in FIG. 4 includes a housing contact 110 and a keyboard contact 112. When the switch detects a connection between the housing contact 110 and the keyboard contact 112, the mobile device determines that the keyboard is in a first position, i.e. the telephone keypad position in this example.

Using the means for determining the position of the keyboard, the mobile device is able to assign a particular functionality to each key when it is activated based on the position of the keyboard. The mobile device's processor, memory and a switch can co-operate to make the determination with respect to keyboard position.

A mobile device according to an embodiment of the present invention advantageously modifies the user interface based on the keyboard position. For example, the mobile device can display a user interface including telephone-related applications, or functions, in response to a determination that the keyboard is in the telephone keypad position. Similarly, the mobile device can display a user interface including data-related applications, or functions, in response to a determination that the keyboard is in the alternate keyboard position.

Based on the determined keyboard position, the keys can be assigned a particular key functionality (or functionalities). For example, the key 102A is assigned the key functionalities relating to inputting the letters "K" and "L" when it is determined that the keyboard is in an alternate keyboard position, such as in FIG. 1A. Similarly, the key 102A is assigned the key functionality relating to inputting the number "2" when it is determined that the keyboard is in a telephone keypad position, such as in FIG. 1B.

A key such as key 102C, shown in FIG. 1A and FIG. 1B, can be used to "over-ride" the assigned key functionality based on the determined keyboard position. For example, activating or pressing the key 102C when the keyboard is in the alternate keyboard position allows the user to use the key functionalities relating to numerical input without having to change the position of the keyboard.

The mobile device can also be provided with one or more detents, posts or other rotation-limiting means, or locking mechanism (not shown in the figures). Such a locking mechanism limits the rotation of the keyboard between the two desired positions and in the desired direction of rotation, as well as to maintain the keyboard in such a position.

Figure 5:
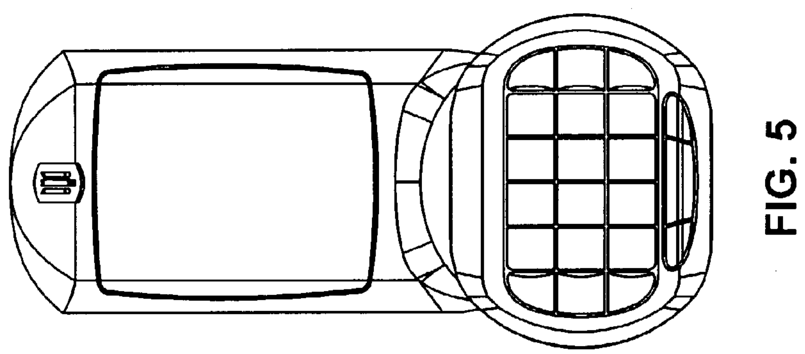
FIG. 5 is a front view of a mobile device according to an embodiment of the present invention having a keyboard in an alternate keyboard position.

FIG. 5 is a front view of a mobile device according to an embodiment of the present invention having a keyboard in an alternate keyboard position. In this alternate keyboard position, the keyboard still retains most of the typical mobile telephone form factor, but provides alternate keyboard functionality. This is achieved in a way that provides a larger surface area and thus greater ergonomic comfort to a user when entering text. The keyboard of FIG. 5 is attached to the housing of the mobile device and can be rotated in a plane between the telephone keypad and alternate keyboard positions. In this particular example, the plane of rotation is the same plane as that of the mobile device's display. This attachment can be achieved by a suitable attachment means, known to those of skill in the art. For example, the keyboard can have a post with an enlarged head, and the keyboard can have a socket for receiving the enlarged head and allowing for rotation of the post. Those skilled in the art will also appreciate that the keyboard is operatively connected to the mobile device for providing inputs thereto, through any suitable data connector, for example.

Figure 6:
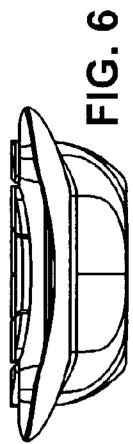
FIG. 6 is an end view of the mobile device of FIG. 5.

FIG. 6 is an end view of the mobile device of FIG. 5, and illustrates the fact that the keyboard extends slightly beyond the body of the mobile device when in the alternate keyboard position. As such, a user can easily hold the device in his/her hand without the awkward feeling of a typical device with a full QWERTY keyboard; yet, the device still provides the advantageous functionality of typing with a full QWERTY keyboard.

Figure 7:
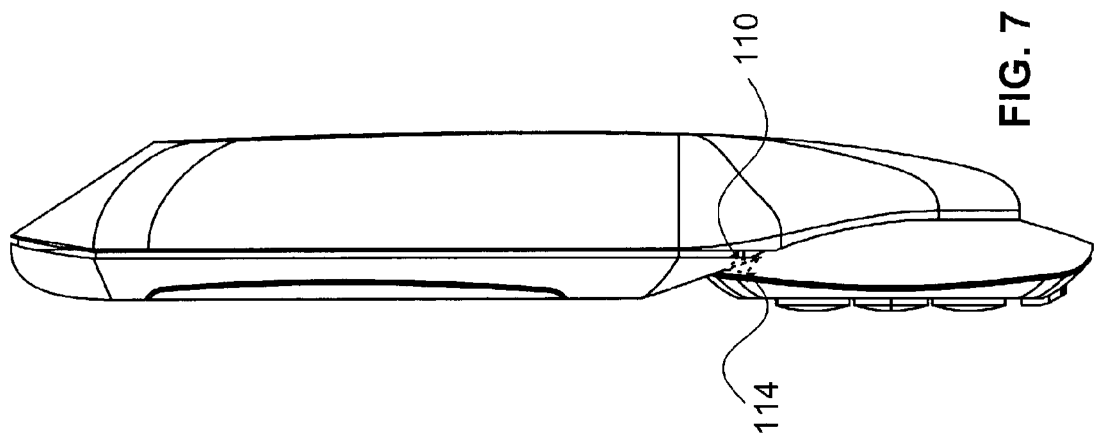
FIG. 7 is a side view of the mobile device of FIG. 5.

FIG. 7 is a side view of the mobile device of FIG. 5, showing a switch that is used to distinguish between the keyboard positions in order to provide the proper key functionality. The switch in FIG. 7 includes a housing contact 110 and a second keyboard contact 114. When the switch detects a connection between the housing contact 110 and the second keyboard contact 114, the mobile device determines that the keyboard is in a second position, i.e. the alternate keyboard position in this example.

Of course, other arrangements for determining the position of the keyboard can be used. For instance, the electrical contacts or switches can be placed in different locations in the mobile device. Also, other types of contacts can alternatively be used. The mobile device can be programmed such that each key, or set of keys, has a default functionality setting when the keyboard is in an intermediate position between the first and second positions. This default setting can be based on the previous position of the keyboard. For example, if the keyboard was last in the alternate keyboard position and is now in between the two positions, the key functionality is assigned to the auxiliary keyboard functionality. The mobile device can alternatively be programmed so as to only accept key input when the keyboard is in one of the two defined positions, and to disable the keys when the keyboard is in between the defined positions.

The layout and arrangement of keys on the keyboard can be varied, while still providing similar functionality in accordance with the scope of the present invention. For example, FIG. 8 is a front view of an alternative embodiment of an keyboard for use with a mobile device. The key layout and groupings of different functions on the keys varies somewhat from that shown in FIG. 1A. This is merely an illustrative example of one variation with respect to key size, key layout and arrangement, and functional grouping.

Figure 9:
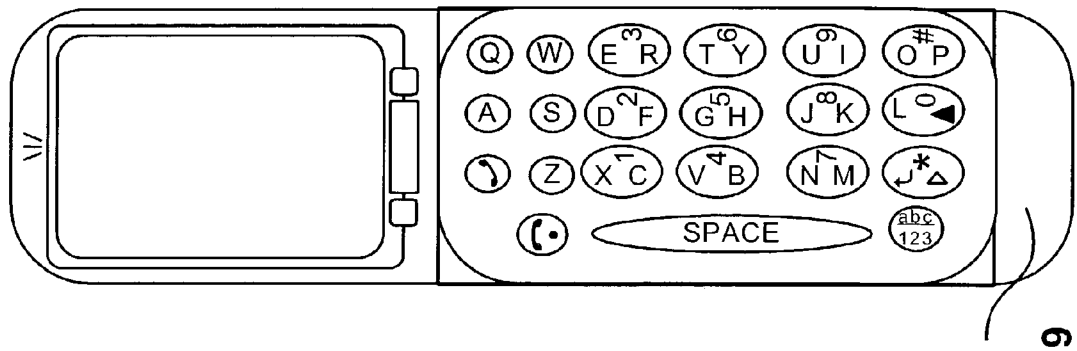
FIG. 9 is a front view of a mobile device according to another embodiment of the present invention with a keyboard shown in a telephone keypad position.

FIG. 9 is a front view of a mobile device according to another embodiment of the present invention with a keyboard shown in a telephone keypad position. The mobile device shown in FIG. 9 employs the keyboard described with respect to FIG. 8. In the example in FIG. 9, some of the keys have first indicia in a first orientation relating to key functions in the first position and second indicia in a second orientation relating to key functions in the second position. The indicia are properly oriented with respect to the user in the first and second positions to display a telephone keypad and an alternate keyboard.

The keyboard arrangement shown in FIG. 9 is illustrative of a variation with respect to the orientations of the sets of indicia with respect to those in FIG. 1. The keyboard in FIG. 9 is preferably rotated in the counter-clockwise direction from the telephone keypad position in order to place the keyboard in the alternate keyboard position. This is in contrast to the keyboard shown in FIG. 1A, which is preferably rotated in the clockwise direction from the telephone keypad position in order to place the keyboard in the alternate keyboard position. Both of these embodiments, however, use keys having first indicia in a first orientation relating to key functions in the first position and having second indicia in a second orientation relating to key functions in the second position. Again in both embodiments, the indicia are properly oriented with respect to the user in the first and second positions to display a telephone keypad and an alternate keyboard.

Many users depend on their mobile device for critical access to information and services. As such, users often want to protect the mobile device from inadvertent damage. In FIG. 9, the mobile device illustrated is provided with a weighted end piece 116, or weighted bottom. The weighted end piece 116 is placed beneath the rotatable keyboard and provides protection for the mobile device. The weighted end piece 116 protects the mobile device from landing on the keyboard when the keyboard is in use, or engaged. The rotation is preferably performed by a single action, single axis rotation.

With the mobile device shown in FIG. 9, replaceable or customizable faceplates can be used in order to provide the user with a manner in which to personalize their mobile device. A replaceable keyboard insert can be engaged with the rotating portion of the keyboard, which also has the keys attached to it. The mobile device can also include additional keys, or other control means, as are shown in FIG. 9 below the display.

Embodiments of the present invention provide a mobile device having a keyboard rotatable between a telephone keypad position and an alternate keyboard position generally in a single plane with respect to the device's housing. The arrangement provides greater ergonomic comfort to a user when entering text. The mobile device can assign functions to each key based on a determined keyboard position and can include a weighted end piece to protect the rotatable keyboard from potential damage due to impact.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A mobile device comprising:

a housing; and a keyboard attached to the housing for rotation between a first position and a second position generally in a single plane with respect to the housing, the keyboard having a plurality of keys, the keys having first indicia in a first orientation relating to key functions in the first position and second indicia in a second orientation relating to key functions in the second position, the first and second indicia being properly oriented with respect to the user in the first and second positions respectively to display a telephone keypad to the user in the first position and to display an alternate keyboard to the user in the second position.

2. The mobile device of claim 1 further comprising at least one switch for determining the position of the keyboard.

3. The mobile device of claim 1 further comprising means for assigning a key function to a key based on a determined keyboard position.

4. The mobile device of claim 1 further comprising means for modifying a displayed user interface based on a determined keyboard position.

5. The mobile device of claim 1 further comprising a locking mechanism for securing the keyboard in a desired position.

6. The mobile device of claim 1 further comprising a weighted end piece provided below the keyboard to minimize potential damage thereto.

7. A keyboard for use with a mobile device having a housing, comprising:

attachment means for attaching the keyboard to the housing for rotation between a first position and a second position generally in a single plane with respect to the housing; and a plurality of keys, the keys having first indicia in a first orientation relating to the first position and second indicia in a second orientation relating to the second position, the first and second indicia being properly oriented with respect to the user in the first and second positions respectively to display a telephone keypad to the user in the first position and to display an alternate keyboard to the user in the second position.

* * * * *